US008644794B1

(12) United States Patent
Sites (10) Patent No.: US 8,644,794 B1
(45) Date of Patent: Feb. 4, 2014

(54) LUGGAGE LOCATOR (75) Inventor: Richard Lee Sites, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 13/365,218

(22) Filed: Feb. 2, 2012

(51) Int. Cl.
H04W 4/22 (2009.01)

(52) U.S. Cl.
USPC ............... 455/404.2; 455/418; 455/456.1; 340/539.13; 340/539.32

(58) Field of Classification Search
USPC .......... 455/404.2, 456.1; 340/539.13, 539.32, 340/572.1, 6.1, 8.1
See application file for complete search history.

(56) References Cited

U.S. PATENT DOCUMENTS

| 5,008,679 | A | 4/1991 | Effland et al. |
| 5,500,648 | A | 3/1996 | Maine et al. |
| 5,570,099 | A | 10/1996 | DesJardins |
| 5,724,660 | A | 3/1998 | Kauser et al. |
| 5,844,521 | A | 12/1998 | Stephens et al. |
| 6,018,312 | A | 1/2000 | Haworth |
| 6,020,847 | A | 2/2000 | Upton et al. |
| 6,249,252 | B1 | 6/2001 | Dupray |
| 6,292,665 | B1 | 9/2001 | Hildebrand et al. |
| 6,441,778 | B1 * | 8/2002 | Durst et al. ............... 342/357.55 |
| 6,694,142 | B1 | 2/2004 | Kuwahara et al. |
| 6,697,628 | B1 | 2/2004 | Green et al. |
| 6,754,502 | B2 | 6/2004 | Hildebrand et al. |
| 6,771,625 | B1 | 8/2004 | Beal |
| 6,934,626 | B2 | 8/2005 | Tingley |
| 7,224,983 | B2 | 5/2007 | Budka et al. |
| 7,236,767 | B1 | 6/2007 | Cankaya et al. |
| 7,436,355 | B2 | 10/2008 | Nicholson et al. |
| 7,738,881 | B2 | 6/2010 | Krumm et al. |
| 7,893,875 | B1 | 2/2011 | Smith |
| 8,350,700 | B2 * | 1/2013 | Fast et al. .................. 340/572.1 |
| 2004/0259566 | A1 | 12/2004 | Maanoja et al. |
| 2005/0231425 | A1 | 10/2005 | Coleman et al. |
| 2006/0030332 | A1 | 2/2006 | Carrott et al. |
| 2006/0202840 | A1 * | 9/2006 | Korbonski ................. 340/573.4 |
| 2007/0052535 | A1 * | 3/2007 | Ranganath ............... 340/539.32 |
| 2007/0124824 | A1 | 5/2007 | Chu |
| 2007/0129085 | A1 | 6/2007 | Kennedy, Jr. |
| 2008/0068265 | A1 * | 3/2008 | Kalliola et al. ............... 342/418 |
| 2009/0315767 | A1 * | 12/2009 | Scalisi et al. ............. 342/357.07 |
| 2011/0210847 | A1 * | 9/2011 | Howard et al. ........... 340/539.32 |
| 2012/0242481 | A1 * | 9/2012 | Gernandt et al. ........ 340/539.13 |

OTHER PUBLICATIONS

TAGG™ The Pet Tracker, "Articles & Reviews," (2012). Retrieved from the Internet on Feb. 27, 2012: URL:http://www.pettracker.com/community/articles/locate-and-track-your-pet-anytime-tagg%E2%80%94-pet-tracker.
TAGG™ The Pet Tracker, "FAQS and Answers," (2012). Retrieved from the Internet on Feb. 27, 2012: URL:http://answers.pettracker.com/articles/General_Info/Proper-Docking-Station-Set-Up.

* cited by examiner

Primary Examiner — Cong Tran
(74) Attorney, Agent, or Firm — Marshall, Gerstein & Borun LLP (57) ABSTRACT A computer device including a transceiver receives broadcasts from cellular sites within a range of the transceiver. The computer device compares the identity of cellular site identifying information received at different periods to determine a transit status of the device and based on the transit status, broadcasts its location.

24 Claims, 5 Drawing Sheets

| PERIOD | SITE SET | | | | UNREPORTED CHANGE FLAG | BROADCAST | LOCATION DIAGRAM |
|---|---|---|---|---|---|---|---|
| 1 | 1 | A | B | — | — | OFF | NO | |
| | 2 | A | B | — | — | | | |
| 2 | 1 | A | B | — | — | ON | NO | |
| | 2 | Z | X | Y | — | | | |
| 3 | 1 | Z | X | Y | — | ON | BROADCAST | |
| | 2 | Z | X | Y | — | | | |
| 4 | 1 | Z | X | Y | — | OFF | NO | |
| | 2 | Z | X | Y | — | | | |

LUGGAGE LOCATOR

FIELD OF TECHNOLOGY

The present disclosure relates to a computing device for determining the geolocation of physical objects and items, such as luggage, in which the computing device is attached thereto.

BACKGROUND

Personal items such as luggage and other travel items may occasionally be misplaced or mishandled, thereby creating a need to locate the lost items or objects. The prior art provides examples of locator systems that may be based on radio frequency transmissions. For example, commercial products exist that require use of a transmitter and receiver pair. Generally, a transmitter may be disposed on an item prone to be misplaced and a receiver unit may be used to locate (e.g., by triangulation) the transmitter from a distance. However, the need for an owner of the item to operate, maintain, and keep accessible a receiver may make these solutions inconvenient. For example, some location systems or devices may not be practical for the general population because of the complexity of using the receiver. Also, the need to have the receiver accessible to locate the lost item may be as problematic as losing the item(s). Moreover, as transceivers are generally limited in range based on federal communication commission (FCC) regulations, the receiver may only be useful for pinpointing the item within a relatively close vicinity to the receiver. Other systems exist, where device range may be greater, but the complexity of using these systems may also increase.

In some cases, tracking movement of an item may not be necessary. In some cases, accuracy of location of a lost item may not need to be very precise. For example, in the case of lost luggage, it may be desirable to simply determine if the luggage arrived in the same city or whether it was routed to a different city or geographic region. In this case, location of a general geographic location may be primarily required. For travel luggage, knowledge of a general region (e.g., a city, an airport, etc.) in which the luggage is currently located may be desired rather than a precise coordinate. In these situations, determining a geolocation of an item may be desired. Generally, geolocation is the identification of a real-world geographic location of an object. Commercial geolocation services may exist but are generally not practical for locating personal items such as bags because of the high cost of the service or of the devices involved with the service. For example, geolocation services currently exist for locating an unknown radio transmitter on Earth using space-based satellites and Earth-based receiving stations. These services may be used by the military and large commercial entities for specific missions. These services may be too costly and unavailable for any retail or consumer applications such as locating travel luggage.

SUMMARY

A method of broadcasting a locator signal from a computer device includes periodically switching the computer device from a low power mode to a normal power mode after a waiting period. While the computer device is in the normal power mode, the method receives, using a transceiver, cellular site broadcasts from a first set of cellular sites within a broadcast range of the transceiver and stores data identifying the first set of cellular sites that is retrieved from the cellular site broadcasts of the first set of cellular sites in a memory of the computer device. Also, while the computer device is in the normal power mode, the method determines, using the computer device, whether the identifying data of the first set of cellular sites matches identifying data of a second set of cellular sites stored in the memory, wherein identifying data of the second set of cellular sites is received in a prior normal power mode period. The method broadcasts an identifier of the transceiver if the identifying data of the first set of cellular sites matches the identifying data of the second set of cellular sites.

In one embodiment, an unreported change location flag may be set when a difference in the identifying data of the first and second cellular sites exists and broadcasting the identifier of the transceiver is performed when identifying data of the first set of cellular sites matches identifying data of the second set of cellular sites and when the unreported change location flag is set.

In another embodiment, a computer device includes a processor, a memory coupled to the processor, a transceiver coupled to the processor, and a power supply coupled at least to the processor. The memory includes a first routine that executes on the processor to switch the computer controlled device from a low power mode to a normal power mode. The memory includes a second routine that executes on the processor to receive, from the transceiver, cellular site broadcasts from a first set of cellular sites within a broadcast range of the transceiver. The memory includes a third routine that executes on the processor to store identifying data retrieved from the cellular site broadcasts that identify the first set of cellular sites. The memory includes a fourth routine that executes on the processor to determine whether the identifying data of the first set of cellular sites matches identifying data of a second set of cellular sites, wherein the identifying data of the second set of cellular sites is received from broadcasts by the second set of cellular sites during a prior normal power mode period. The memory includes a fifth routine that executes on the processor to broadcast an identifier of the transceiver when identifying data of the first set of cellular sites matches identifying data of the second set of cellular sites. The memory includes a sixth routine that executes on the processor to switch the computer controlled device to a low power mode. The memory includes a seventh routine the executes on the processor to periodically executes the first, second, third, fourth, fifth, and sixth routines after a waiting period.

DETAILED DESCRIPTION

A computing device, also herein referred as a locator device, may be used to determine the geolocation of physical objects and items, such as luggage, in which the computing device is attached thereto. The locator device may include a transceiver circuit for communicating with one or more cellular network sites or towers. The device may include an algorithm that allows the computing device to be energy efficient and forego broadcasting during transit. The locator device may comprise an electronic circuit for implementing the algorithm and for implementing the transceiver for communicating with the cellular network sites and a battery for powering the electronic circuit. The electronic circuit may have integrated with it an antenna. Larger antennas may be coupled to the electronic circuit depending on the application of the locator device.

Figure 1:
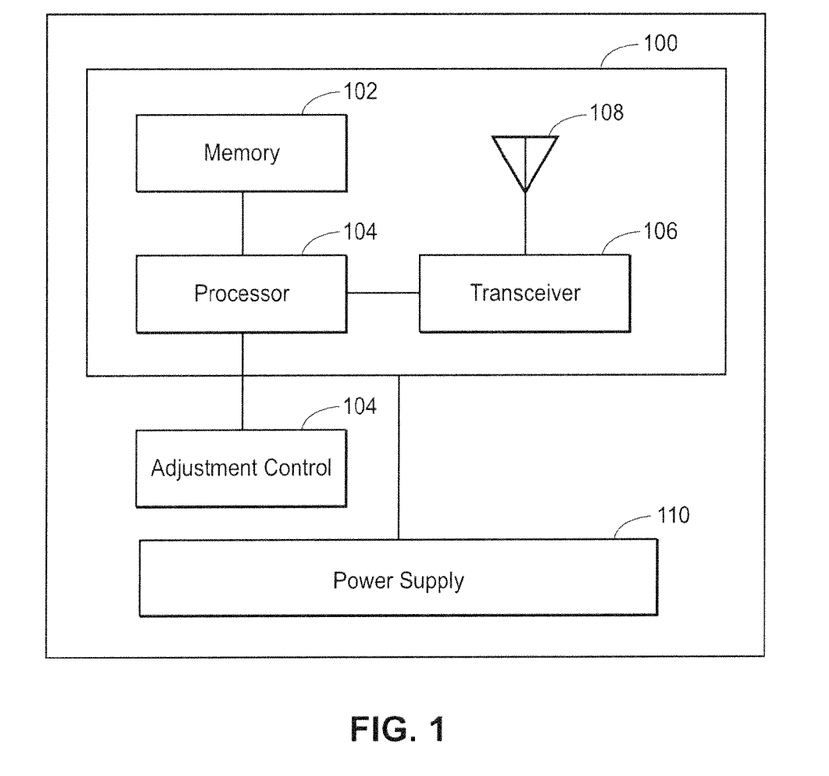
FIG. 1 illustrates a diagram of a locator device.

FIG. 1 illustrates an embodiment of a locator device. The locator device may include a main circuit 100 that includes a transceiver circuit 106 having an antenna 108. The antenna may be any suitable antenna configured to transmit and receive electromagnetic signals (such as radio frequency signals or "RF"). The transceiver 106 may be communicatively coupled to a processor 104 which may be communicatively coupled to a memory 102. The main circuit 100 may be powered by a power supply 110. The power supply 110 may be, for example, a portable battery unit. In some embodiments an optional adjustment control circuit or device 104 may be coupled to the processor 104.

In one embodiment, the transceiver circuit 106 may be configured to receive signals from a set of cellular (or simply cell) communication network towers (or sites). As used herein, a set is one or more elements or items, and thus a set of cell communication network towers comprises one or more cell communication network towers. Generally, a cellular network is a radio network distributed over areas called cells, wherein each cell may be served by at least one fixed-location transceiver known as a cell site, a cell network tower, or a cell base station. When joined together these cells may provide radio coverage over a wide geographic area. This network may enable a large number of mobile communication devices (e.g., mobile phones, pagers, etc.) to communicate with each other and with fixed transceivers and telephones anywhere in the network, via the base stations, even if some of the mobile devices are moving through more than one cell during transmission. One or more telecommunications carriers (TELCOs) may control a cellular network and provide additional equipment for communicatively coupling the cell network to a public switched telephone network (PSTN) network or Integrated Services Digital Network (ISDN) and may be responsible for collection and billing of communication services provided to mobile phones that are connected to its controlled network with other subscribed phones of its network and/or with other cell networks and/or with the PSTN or ISDN.

Cell sites or cell towers of a communications network or cell network may be responsible for providing communications coverage for a specific area (cell). To enable a network to determine which cell tower is communicating with a mobile device, each cell tower or cell site may have a unique identifier associated with it. This identifier may allow a cell network to identify each cell tower and its corresponding area of coverage within its network. The cell towers may operate to provide at least two channels of communication with a mobile device: a first channel for connection handling and a second channel for voice and data transmission. Generally, the voice and data transmission channel(s) use a greater amount of network resources (e.g., bandwidth and processing capacity) than the connection handling channels, which may incur much less network overhead. While not all mobile devices that are capable of communicating with a cell site may be permitted to use a voice/data channel, mobile devices may generally be allowed to communicate with one or more cell sites of a cell network with the connection handling channel to initiate connection handling protocols. In some implementations, part of the connection handling protocols involves cell towers broadcasting their presence to potential mobile transceivers in the vicinity of the cell towers. The cell tower broadcast may include the cell tower identifier which identifies to the network and to any potential mobile device the identity of each tower that the mobile transceiver may receive a signal from. The locator device circuit 100 may programmed to receive the cell tower or cell site broadcasts and to receive cell site identifier information and to communicate back with one or more of the cell towers based on the identifier information, as further discussed below.

Figure 2:
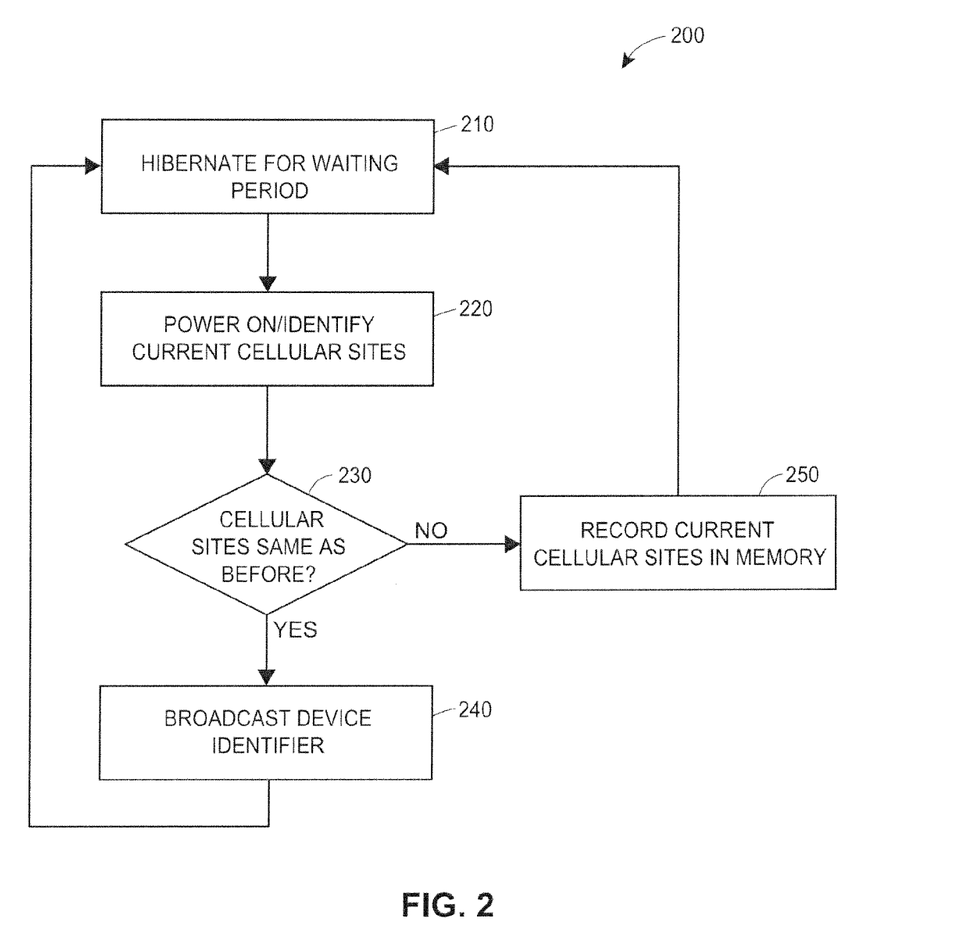
FIG. 2 illustrates a process diagram for implementing or operating the locator device.

FIG. 2 illustrates a process flow or flow chart of a method, routine, or process 200, that may be used to implement the locator device. The locator device may hibernate or wait for a period of time at a block 210. Generally, the locator device may operate under three different power states. The process of hibernating may involve placing the locator device in a first power state being a reduced or low power mode in which the main circuit 100 may operate with a minimal amount of power. The lower power mode may be initiated, for example, by reducing processor activity to a minimal amount necessary for quick activation. The lower power mode may be initiated by turning off the transceiver. Hibernating may also be called a standby state.

At block 220, after hibernating for the waiting period of block 210, the locator device may switch to a second power state in which transceiver 106 is operating to receive signals and where processor 104 is operating to identify cellular sites that are within a vicinity of the locator device. Generally, the block 220 may utilize transceiver 106 to receive cell site broadcast messages from nearby cell sites and to receive the cell site identifiers which may generally be included with the cell site broadcasts (as described above). For a general cell network, the cell site identifiers that may be received by the locator device at any particular time may be used to identify a general location of the locator device. For example, where the cell identifiers are assumed to be unique in a particular carriers' network, being able to receive the cell site identifiers may indicate a general location of the locator device to be within a vicinity of the cell towers that the device locator is able to receive broadcast signals from. Thus, in one embodiment, a general location of the locator device may be indicated simply by the combination of received cell site identifiers received by the locator device.

The block 220 may store the set of received cell site identifiers to the memory 102 for further processing. Memory 102 may store a set of cell site identifiers from a prior cycle or iteration of the method of FIG. 2. When a prior set of cell site identifiers exist, a block 230 may determine whether the current set of cell site identifiers match or correspond with a prior set of received cell site identifiers. If the current set of cell site identifiers match a prior set of cell site identifiers, a block 240 may use the transceiver and antenna 108 to broadcast a message that includes information of an identifier of the luggage locator. The block 240 may place the device in a third power state in which the device is power on and actively transmitting. The identifier of the luggage locator may be an International Mobile Equipment Identity (IMEI). Generally, an IMEI is a number, usually unique, to identify Global System for Mobile Communications (GSM), Wideband Code Division Multiple Access (WCDMA), and Integrated Digital Enhanced Network (iDEN) mobile phones, as well as some satellite phones. Broadcasting at block 240 may include initiating or executing any necessary negotiation protocols for establishing a channel of communication with one or more of the cell sites in the current set of cell sites and for transmitting or otherwise communicating with the one or more cell sites to convey the locator device's identifier to the one or more cell sites. Generally, transmission in the third power state requires significantly more power than the first lower power (idle) state or the second receiving-only power state. The receipt of the locator device identifier by a cell site may initiate a registration process of the locator device with the cell network. As part of the registration process, a general device location of the locator device may be recorded by the cell network. This may involve simply indexing or linking the locator device identifier with an identifier of a cell site that communicated with the locator device. This may be done in some cell networks using one or more registry databases such as a Home Location Register (HLR) for GSM networks. As described above, a general location of a mobile device may be indicated by the identify of the respective cell site that initiates or establishes communication with and/or registers the locator device. The process may then return to block 210 to hibernate for another waiting period in the first low power state.

If the locator device determines at block 230 that the current set of cell sites does not match the prior set of cell sites, the process of FIG. 2 may proceed directly to block 250 to record the current set of cell sites into memory 102 and return the process to block 210. In this case, the locator device may not broadcast its location to any cell tower for the current cycle, thereby foregoing operating in the third power transmission state. The locator device may be configured to broadcast its identifier only when it is receiving or identifying the same set of cell sites over a period of time. Generally, this may indicate that the locator device is stationary and not in transit, as receiving the same set of cell site identifiers over a period of time may indicate that the locator device is within the same vicinity of the same set of cell sites. In this manner, the locator device may reduce energy costs as it foregoes broadcasting while in transit and remains primarily in the second power state (receiving state) until it has been stationary for a period of time (e.g., for at least one waiting period). Another primary advantage of the timing circuit is that in situations in which broadcasting may be unwanted or undesirable during transit, the device does not transmit. This may be especially applicable to situations such as in-flight baggage, where mobile transmission may not be allowed. Moreover, this circuit may be advantageous where only a final resting location of a device to which the locator device is attached is needed. For example, the circuit may be applicable to finding geo-locations of mobile items once they have reached a stable stationary state.

In one embodiment, the locator device may forego a broadcast when either one of the memory portions contains a null set. This may happen, for example, during a first operation of the device in which there is no prior cell site data. This may also occur when the locator device does not receive any signals from any cell sites. In this case, there may be no cell sites available to receive a broadcast from the locator device and it may be desirable for the locator device to forego transmission until it is within the vicinity of a cell site.

In one embodiment, the locator device may be configured to retain or record only the most recent set of cell sites once block 230 is finished processing. Accordingly, block 250 may, in one embodiment, store information on only one prior set of cell sites for future processing. This may be performed to save memory or to reduce the minimum required size of memory 102 that may needed to operate the locator device. In one embodiment, the block 250 may overwrite information or data on the prior set of cell sites with the current set of cell sites.

An optional process block to FIG. 2 (not shown) may control or adjust the waiting period of block 210. For example, the waiting period may be adjusted to correspond with a type of mobile item that is being tracked or located. For example, when it comes to luggage, the waiting period may be hours since luggage is generally moved a long distance until it reaches a destination and then becomes stationary for a long period of time, at which point the locator device may then activate to report its location. Thus, for some luggage locator applications, an hour may be an appropriate waiting period. For other items in which travel times may be much shorter, the waiting period may be adjusted to be in minutes or even seconds. Adjustment control 104 of FIG. 1 may be used to adjust the waiting period of block 210. The adjustment control 104 may be a manual control that is adjusted by a user (e.g., a variable control device) or may be an automatic control circuit that may automatically adjust the waiting period depending on prior travel data. For example, in one embodiment, the process of FIG. 2 may include an optional count block that counts the number of periods in which no broadcast is initiated by the locator device. When the device counts are greater than a threshold number of periods, then the device may increase the wait time. Similarly, when the device counts are lower than a threshold number of periods, the waiting period may be decreased. Other automatic adjustments may be made based on other travel parameters.

Figure 3:
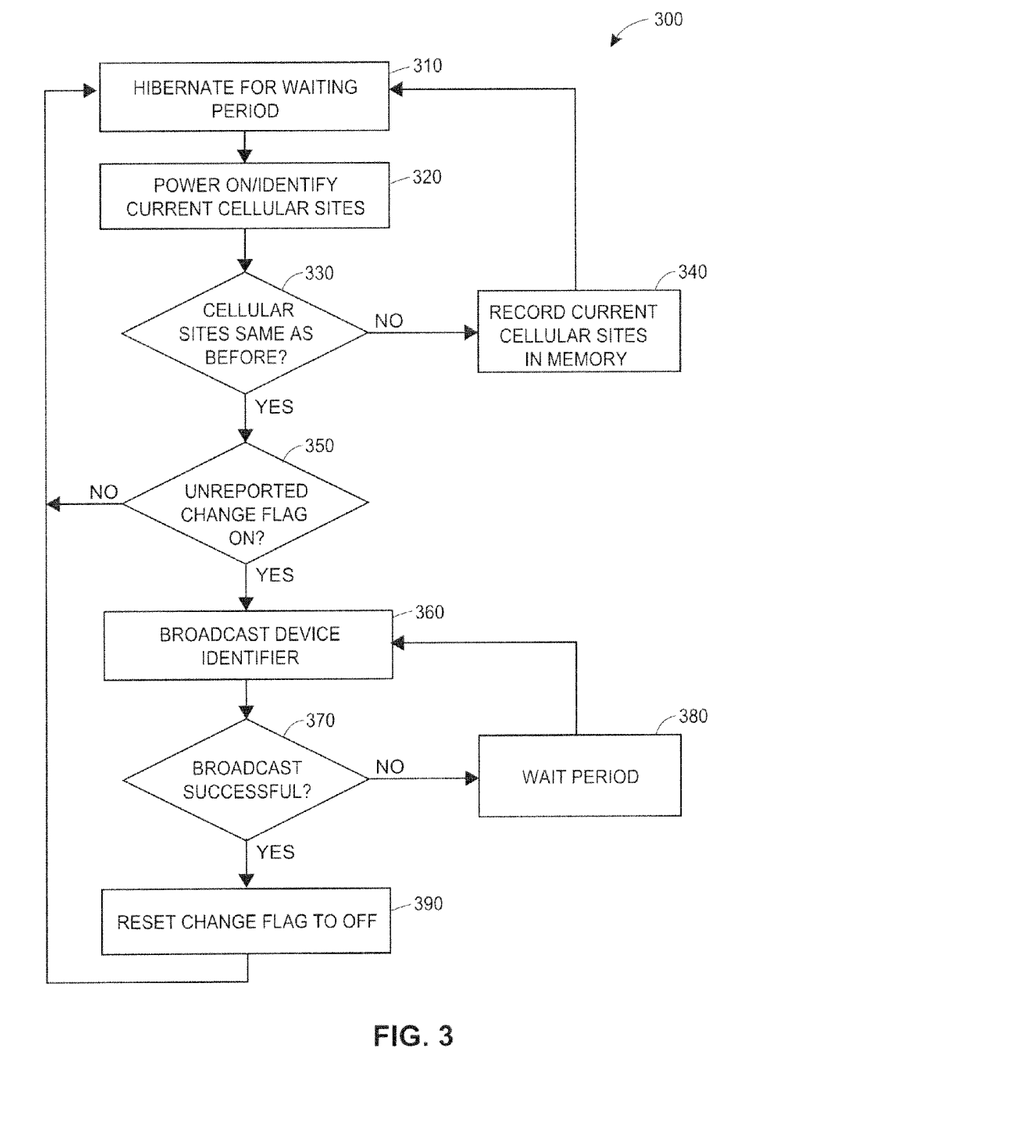
FIG. 3 illustrates a second process diagram for implementing or operating the locator device.

FIG. 3 illustrates another embodiment of a process flow or flow chart of a method, routine, or process 300, that may be used to implement the locator device. In FIG. 3, the locator device may hibernate for a waiting period at a block 310 in a first low power/idle state. At block 320, the locator device may switch to a second power state in which the device receives signals and operates to identify cell sites that are within a vicinity of the locator device. Similar to FIG. 2, block 320 may be performed by receiving broadcast transmissions from nearby cell sites using transceiver 106 and antenna 108. A block 330 may determine whether a current set of cell sites that is identified in block 320 matches or corresponds with a prior set of cell sites stored in memory (e.g., memory 102). If the current set of cell sites does not match the prior set of cell sites, a block 340 may record the current set of cell sites in memory and the process may return to block 310. In one embodiment, the block 340 may overwrite information or data on the prior set of cell sites with the current set of cell sites.

If the prior set of cell sites and the current set of cell sites match at block 330, then a block 350 may determine whether a unreported change flag is set (e.g., set to ON). If the unreported change flag is not set (e.g., set to OFF), the process may return to the block 310 for a waiting period. If the unreported change flag is set, then a block 360 may operate in a third power state to initiate and execute a broadcast to one or more of the current set of cell sites. The broadcast may include information on the device identifier of the locator device. A block 370 may determine whether the broadcast was successful. Block 370 may include execution of a negotiation protocol or process with one or more of the current set of cell sites. This negotiation protocol may include a response from the one or more cell sites confirming that the locator device broadcast was received. This negotiation may also include a confirmation that the locator device identifier has been registered or recognized by the cell network. If the block 370 does not determine a successful broadcast, a block 380 may initiate a wait period before directing the process back to the block 360 for another broadcast and attempt to register the device identifier with one or more cell networks. If the block 370 determines a successful broadcast, then a block 390 may reset the change flag (e.g., set the flag to OFF) and the process may return to block 310 for another cycle.

As discussed the locator device may operate in one of three power states: a first low power or idle state; a second power state in which the device receives signals; and a third power state in which the device transmits. Generally, transmitting consumes more power than receiving and receiving consumes more power than being in an idle state. Thus, a good portion of power may be conserved by avoiding transmission in the third power state. The device locator may operate according to FIG. 3 to provide a single confirmed broadcast primarily when the device locator has been moved and then settled into a stationary location for a period of time. This avoids transmission in the third power state and may further reduce the amount of power consumed by the device as the device only broadcasts when it confirms that its location has been recognized or received by a local cell network.

Figure 4:
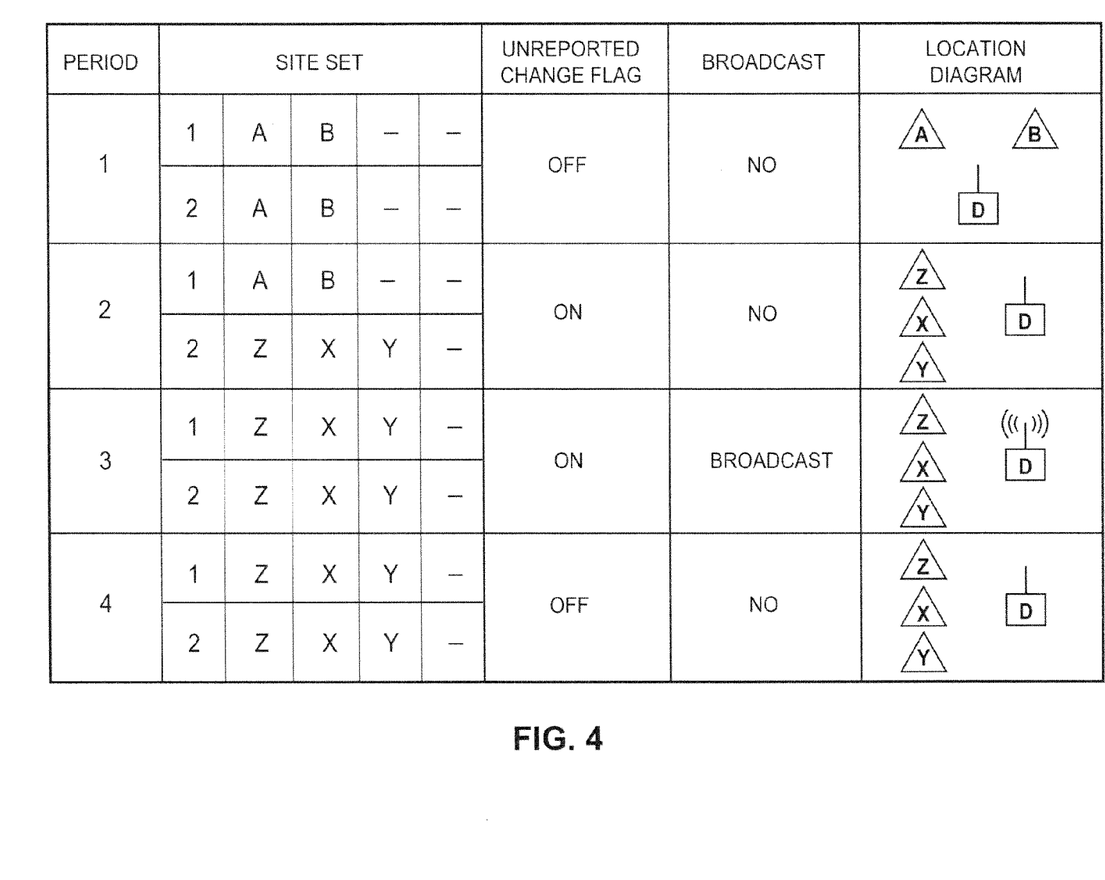
FIG. 4 illustrates a memory allocation and timing chart for a process of implementing the locator device.

FIG. 4 illustrates a timing chart for operation of the locator device according to the process of FIG. 3. In this embodiment, the memory 102 of the locator device may be configured as a first and a second memory portion, which may represent different portions of memory 102. In other embodiments, memory 102 may represent a plurality of different memory devices and a first and a second memory may represent physical distinct memory devices. One skilled in the art will understand that implementations of a first and a second memory may me performed in a number a manners and still be consistent with the device described herein. The first and the second memory portions may be configured to store cell site identifiers represented by the letters A, B, X, Y and Z. The letters A, B, X, Y, and Z are merely illustrative and actual identifiers may take on a number of different forms (e.g., numerical, alphabetical, etc.). A two portion memory configuration of the locator device is illustrated by the second column of FIG. 4 entitled, "Site Set." A third column of the table of FIG. 4 indicates a unreported change flag setting. This unreported change flag may correspond with the unreported change flag of FIG. 3. Generally, this flag setting may indicate whether there is a difference between a prior set of cell sites and a current set of cell sites. This difference may be determined in one embodiment by comparing the set of cell site identifiers of the first and the second memory. A fourth column of the table of FIG. 4 indicates whether the locator device may initiate or execute a broadcast. A fifth column indicates a vicinity diagram showing the locator device as symbol D and cell sites proximate the locator device as symbols, A, B, X, Y, and Z.

A first period of the chart illustrates that both the first and second memories record the same identifiers of the same set of cell sites. The unreported change flag is off and no broadcast is initiated. The location diagram indicates that the locator device D is within the vicinity of cell sites A and B. A second period of the chart illustrates that a current set of cell sites Z, X, Y of the second memory is different from the prior set of cell sites A, B of the first memory. In this case, the unreported change flag is set to ON, indicating that a change of location has occurred. However, no broadcast may be initiated or executed in this period. The location diagram for the second period illustrates that the locator device may be currently within the vicinity of cell sites Z, X, Y, which may be different from the prior first period (being in the vicinity of cell sites A and B only).

A third period indicates a match between a prior set of cell sites in the first memory and a current set of cell sites in a second memory. The unreported change flag is set to ON. In this period, the locator device may initiate or execute a broadcast to one or more of the cell sites of the current set of cell sites that include cell sites Z, X, and Y. After the broadcast, the change unreported change flag may be reset or set to OFF. In some embodiments, the unreported change flag may be reset only after a confirmation or verification that the broadcast was successfully received on processed (e.g., after a registration process is completed).

A fourth period indicates a match between prior and current cell sites. Generally, this indicates that the device has not moved from a prior position of a preceding period (as illustrated by the location diagram of period 3 and 4) and has reported its position (e.g., via a broadcast) in a prior period. Accordingly, there is no broadcast in this period. The change set setting is indicated as OFF.

Figure 5:
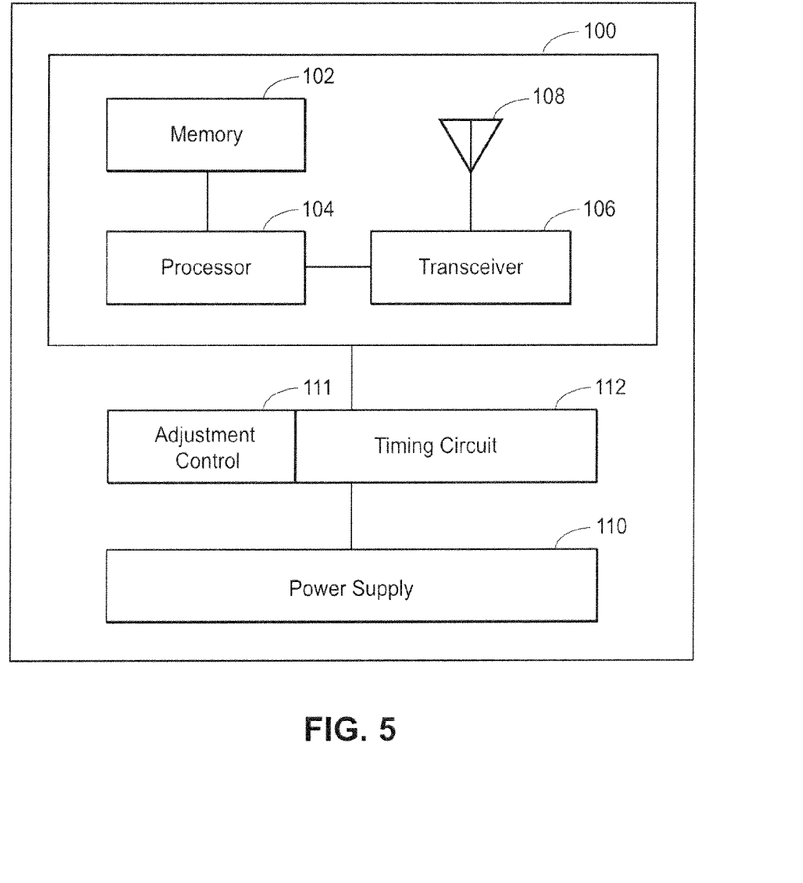
FIG. 5 illustrates an alternative device diagram for the locator device.

FIG. 5 illustrates another embodiment of an electronic circuit for implementing a locator device. The main circuit 100 is similar to that of FIG. 1, including a transceiver 106 and an antenna 108 coupled to a processor 104 and memory 102. In this embodiment, a timing circuit 112 may be disposed between the main circuit 100 and a power supply 110. In this embodiment, the timing circuit may implement part of the logic of FIGS. 2-3 by executing a low power mode waiting period. For example, the blocks 210 and 310 and portions of block 220 and 320 may be carried out by timing circuit 112. The timing circuit 112 may be configured to reduce or turn off power from the power supply 110 to the main circuit 100 based on the waiting period of blocks 210 and 310. Also, the timing circuit 112 may also be configured to turn on power to the main circuit 110 based on blocks 220 and 320 when the waiting period is over. In this embodiment, the main circuit may still be configured to execute the other blocks of FIGS. 2-3.

FIG. 5 illustrates that an adjustment control 111 may be coupled to the timing circuit 112. In this embodiment, the adjustment control 111 may used to control the waiting period of timing circuit 112. For example, the adjustment control 111 may be configured to set the duration of the waiting period by which timing circuit 112 may increase power (e.g., turn on) or decrease power (e.g., turn off) to main circuit 100. In some embodiments, the adjustment control 111 may be a manually set device such as a variable controller which may be used to directly set the waiting period. In some embodiments the adjustment control 111 may be an automated circuit as described above. In the embodiment of FIG. 5, the adjustment control may receive indications from main circuit 100 (e.g., from processor 104 or transceiver 106) that indicate when broadcasts are made. Based on the number of periods that transpire between broadcasts, the adjustment control 111 may adjust the waiting period accordingly (as described above).

Generally, the locator device may be configured to communicate with existing cell networks to communicate its geolocation to an interested party. In one embodiment, a server may be used to interface with the cell network to receive geolocation information on the whereabouts of the device locator once the device locator broadcasts its location. This system embodiment may include the locator device, the cellular communication network, a location service provider server, and software interfaces between the cellular communication network and the location service provider server. Existing financial arrangements may exist between one or more cellular network carriers and a service provider where portions of data from the cellular communication network may be provided the service provider. In these situations, the software interfaces may already exist between a service provider and the communications carrier to provide cell network data. The software interfaces may be adapted to provide the specific location information to the location server. More particularly, a map of cell sites and cell identifiers could be used to translate an identifier of a cell site that receives a broadcast from the device locator into a geolocation of the locator device.

In this system embodiment, location information on the locator device (once it has broadcast its identifier) may be recorded by the cellular network and then provided to the location service provider server. The location service provider may then report that information to the owner of the locator device in a computer accessible matter (e.g., over the Internet). In some embodiments, the service provider server may generate a map showing the location of the locator device once the locator device has broadcast its location and registered with the cellular network. The accuracy of the location may be based on the density of cell sites within the vicinity of the locator device. For example, in areas that have a lower number of surrounding cell sites that are spaced relatively far apart (e.g., approximately 1 kilometer radius), the accuracy of the location may be within a few kilometers. In more densely populated areas that have a greater number of cell sites or base stations per unit area, the location of the device may be determined within a kilometer. This location accuracy may be sufficient for certain items such as lost baggage where an owner of the luggage may be able to direct an airline representative to a geographic region to search for the lost baggage.

In one alternative embodiment, instead of using a cellular communications network base stations, the locator device may be configured to operate with a network of one or more wireless network base stations (Wi-Fi base stations) that are connected to the internet. In this system, a financial arrangement may be made, for example, with a company that has a wide network of locations (e.g., a franchise) that have Wi-Fi base stations. In this case, the locator device may be configured to connect with a local Wi-Fi base station and communicate its identifier to a location service provider server via the Wi-Fi base station connection. The same principle of identifying each Wi-Fi base station by geographic location may be used to determine the location of a locator device once it has established a connection with a particular Wi-Fi base station.

Generally, a compact size is desirable for the locator device. The smaller the size of the locator, the easier it may be to attach the device to an item of interest. Because the described device locator minimizes power consumption by selectively and intermittently transmitting its location, it may be configured to operate using a small battery with a long lifetime. Moreover, because the locator device may require less power to transmit to nearby base cell stations (since the locator may be configured only to transmit within a range of a cell site), the size of its circuitry may be made very small. For example, a basic unit may be the size of a luggage tag and may have a one year or longer battery life. Moreover, because using the mobile connection handling channel of a cell network requires low overhead, network carriers may be more likely to implement data sharing services for using the device. Since many network carriers have existing relationships and contracts for information services, it may be highly probably to use a national or international carrier for such geolocation devices.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, blocks or mechanisms. Blocks or modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a locator device for purposes of illustration only. One skilled in the art will readily recognize from the above discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of broadcasting a locator signal from a computer device that includes a transceiver comprising:
periodically switching the computer device from a low power mode to a normal power mode after a waiting period and while the computer device is in the normal power mode:
receiving, using the transceiver, cellular site broadcasts from a first set of cellular sites within a broadcast range of the transceiver;
storing, in a memory of the computer device, data identifying the first set of cellular sites that is retrieved from the cellular site broadcasts of the first set of cellular sites;
determining, using the computer device, whether the identifying data of the first set of cellular sites matches identifying data of a second set of cellular sites stored in the memory, wherein identifying data of the second set of cellular sites was received in a normal power mode period; and
broadcasting, using the transceiver, an identifier of the transceiver if the identifying data of the first set of cellular sites matches the identifying data of the second set of cellular sites.

2. The computer method of claim 1, further including setting an unreported change location flag if the first set of cellular sites does not match the second set of cellular sites and wherein broadcasting the identifier of the transceiver is performed when identifying data of the first set of cellular sites matches identifying data of the second set of cellular sites and when the unreported change location flag is set.

3. The computer method of claim 2, further including resetting the unreported change location flag after broadcasting the transceiver identifier.

4. The computer method of claim 3, wherein resetting the unreported change location flag is performed only after a successful broadcast is confirmed.

5. The computer method of claim 1, further including foregoing broadcasting the identifier of the transceiver if identifying data of the first set or the second set of cellular sites contains a null set.

6. The computer method of claim 1, wherein periodically powering on the computer device from the lower power mode after the waiting period is performed by a timing circuit external to a processor of the computer device that controls power to the computer device from a power source.

7. The computer method of claim 1, further including powering the transceiver on for a period of time when receiving from and transmitting to the first set of cellular sites and turning off the transceiver for the waiting period.

8. The computer method of claim 1, further including adjusting the waiting period based on a frequency of broadcast of the locator device.

9. The computer method of claim 1, further including clearing the identifying data of the second set of cellular sites after determining whether the first set of cellular sites matches the second set of cellular sites.

10. A computer controlled device for locating a physical object comprising:
   a processor;
   a memory coupled to the processor;
   a transceiver coupled to the processor;
   a power supply coupled at least to the processor;
   a first routine, stored in the memory, that executes on the processor to switch the computer controlled device from a low power mode to a normal power mode;
   a second routine, stored in the memory, that executes on the processor to receive, from the transceiver, cellular site broadcasts from a first set of cellular sites within a broadcast range of the transceiver;
   a third routine, stored in the memory, that executes on the processor to store identifying data retrieved from the cellular site broadcasts that identify the first set of cellular sites;
   a fourth routine, stored in the memory, that executes on the processor to determine whether the identifying data of the first set of cellular sites matches identifying data of a second set of cellular sites, wherein the identifying data of the second set of cellular sites is received from broadcasts by the second set of cellular sites during a prior normal power mode period;
   a fifth routine, stored in the memory, that executes on the processor to broadcast an identifier of the transceiver when identifying data of the first set of cellular sites matches identifying data of the second set of cellular sites;
   a sixth routine, stored in the memory, that executes on the processor to switch the computer controlled device to a low power mode; and
   a seventh routine, stored in the memory, the executes on the processor to periodically executes the first, second, third, fourth, fifth, and sixth routines after a waiting period.

11. The computer controlled device of claim 10, further including an eighth routine, stored in the memory, that executes on the processor to set an unreported change location flag if identifying data of the first set of cellular sites does not match identifying data of the second set of cellular sites and wherein the fifth routine broadcast the identifier of the transceiver when the first set of cellular sites matches the second set of cellular sites and when the unreported change location flag is set.

12. The computer controlled device of claim 11, further including a ninth routine, stored in the memory, that executes on the processor to reset the unreported change location flag after the fifth routine broadcasts the transceiver identifier.

13. The computer controlled device of claim 12, wherein resetting the unreported change location flag is performed only after a successful broadcast is confirmed.

14. The computer controlled device of claim 10, further including an eighth routine, stored in the memory, that executes on the processor to forego broadcasting the identifier of the transceiver if the first set of cellular sites or the second set of cellular sites is a null set.

15. The computer controlled device of claim 10, wherein the computer controlled device further includes a timing circuit that is coupled to the power supply, the timing circuit periodically switching the computer controlled device from the low power mode to the normal power mode after the waiting period.

16. The computer controlled device of claim 10, further including an eighth routine, stored in the memory, that executes on the processor to switch the transceiver on for a period of time when receiving from and transmitting to the first set of cellular sites and switching off the transceiver for the waiting period.

17. The computer controlled device of claim 10, further including an eighth routine, stored in the memory, that executes on the processor to adjust the waiting period based on a frequency of broadcast of the locator device.

18. The computer controlled device of claim 10, further including an eighth routine, stored in the memory, that executes on the processor to clear the identifying data of the second set of cellular sites after determining whether identifying data of the first set of cellular sites matches identifying data of the second set of cellular sites.

19. A computer controlled device for locating a physical object comprising:
   a processor;
   a memory coupled to the processor;
   a transceiver coupled to the processor;
   a power supply coupled at least to the processor;
   a first routine, store in the memory, that executes on the processor to switch the computer controlled device from a lower power mode to a normal power mode;
   a second routine, stored in the memory, that executes on the processor to receive, from the transceiver, cellular site broadcasts from a first set of cellular sites within a broadcast range of the transceiver;
   a third routine, stored in the memory, that executes on the processor to store identifying data retrieved from the cellular site broadcasts that identify the first set of cellular sites;
   a fourth routine, stored in the memory, that executes on the processor to determine whether the identifying data of the first set of cellular sites matches identifying data of a second set of cellular sites, wherein the identifying data of the second set of cellular sites is received during a prior normal power mode period;
   a fifth routine, stored in the memory, that executes on the processor to set an unreported change location flag if the first set of cellular sites does not match the second set of cellular sites;
   a sixth routine, stored in the memory, that executes on the processor to broadcast an identifier of the transceiver when the first set of cellular sites matches the second set of cellular sites and when the unreported change location flag is set;

a seventh routine, stored in the memory, that executes on the processor to switch the computer controlled device to a low power mode;

a eighth routine, stored in the memory, that executes on the processor to periodically execute the first, second, third, fourth, fifth, sixth, and seventh routines after a waiting period.

20. The computer controlled device of claim 19, further including a ninth routine, stored in the memory, that executes on the processor to reset the unreported change location flag after broadcasting the transceiver identifier.

21. The computer controlled device of claim 19, further including a ninth routine, stored in the memory, that executes on the processor to receive an adjustment signal and to adjust the waiting period based on the adjustment signal.

22. A system for locating a physical object comprising:

a first computer device including a processor, a memory coupled to the processor, a transceiver coupled to the processor, and a power supply coupled at least to the processor, wherein the first computer device is programmed to periodically switch the computer device from a low power mode to a normal power mode after a waiting period and while the computer device is in the normal power mode:

receive, using the transceiver, broadcasts from a first set of networked transmission stations within a broadcast range of the transceiver using a first communication channel, wherein the transmission stations are communicatively coupled to each other;

store, in a memory of the computer device, data identifying the first set of networked transmission sites that is retrieved from the broadcasts of the first set of networked transmission sites;

determine, using the computer device, whether the identifying data of the first set of networked transmission sites matches identifying data of a second set of networked transmission sites stored in the memory, wherein identifying data of the second set of networked transmission sites was received in a normal power mode period; and broadcast, using the transceiver, an identifier of the transceiver if the identifying data of the first set of networked transmission sites matches the identifying data of the second set of networked transmission sites; and a second computer device communicatively coupled to at least one of the second set of networked transmission sites, wherein the second computer device is programmed to receive information on the broadcast of the first computer device received from the at least one networked transmission site and wherein the second computer device is further programmed to determine a location of the first computer device based on an identity of the at least one networked transmission site.

23. The system of claim 22, wherein the first networked transmission sites and the second networked transmission sites are Wi-Fi base stations that are communicatively coupled via the Internet.

24. The system of claim 22, wherein the second computer device is further programmed to provide a map indicating the location of the first computer device.

\* \* \* \* \*